Figure 1:
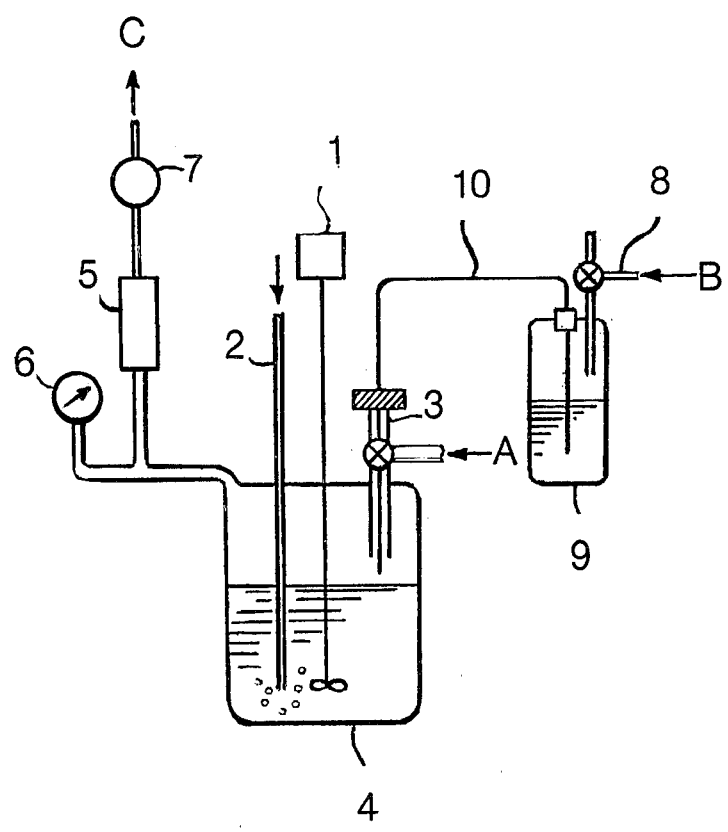

United States Patent [19]

Furukawa et al.

[11] 4,373,074

[45] Feb. 8, 1983

[54] ACETYLENE-CONJUGATED DIENE POLYMERIZATION

[75] Inventors: Junji Furukawa, Kyoto; Nobuo Furuno, Neyagawa; Akira Matsumura, Neyagawa; Teruaki Kuwajima, Neyagawa, all of Japan

[73] Assignee: Nippon Paint Co., Ltd., Japan

[21] Appl. No.: 270,121

[22] Filed: Jun. 3, 1981

[30] Foreign Application Priority Data

Jun. 3, 1980 [JP] Japan .................................. 55-75227
Jun. 3, 1980 [JP] Japan .................................. 55-75228
Jun. 3, 1980 [JP] Japan .................................. 55-75229
Jun. 3, 1980 [JP] Japan .................................. 55-75230

[51] Int. Cl.$^3$ ............................................. C08F 4/70
[52] U.S. Cl. ........................................ 526/92; 526/93; 526/142; 526/285; 585/507
[58] Field of Search ................... 526/92, 93, 142, 285; 585/507

[56] References Cited

U.S. PATENT DOCUMENTS 4,006,113 2/1977 Furukawa et al. .................. 526/685

FOREIGN PATENT DOCUMENTS 49-48665 12/1974 Japan .
50-14272 5/1975 Japan .
54-42398 12/1979 Japan .

Primary Examiner—Stanford M. Levin
Attorney, Agent, or Firm—Wenderoth, Lind & Ponack

[57] ABSTRACT

A process for preparing copolymers of acetylene and conjugated diene compounds by copolymerization of acetylene with at least one conjugated diene compound in the presence of a catalyst composition in a reactor, characterized in that the catalyst composition comprises a dialkyl aluminum halide, an organic nickel compound and an active hydrogen compound, of which the molar concentrations have the following relationships:

$$[Al] = 2[Ni] + [H]$$
$$[Al]/[Ni] > 4$$

wherein [Al], [Ni] and [H] represent respectively the molar concentrations of the dialkyl aluminum halide, of the organic nickel compound and of the active hydrogen compound, whereby the copolymer was obtained in a good yield without by-production of any gel material.

7 Claims, 4 Drawing Figures

ACETYLENE-CONJUGATED DIENE POLYMERIZATION

The present invention relates to a process for preparing copolymers of acetylene and conjugated diene compounds. More particularly, it relates to a process for preparing linear random copolymers of acetylene and conjugated diene compounds soluble in organic solvents in good yields.

In general, acetylene acts as a catalyst poison in ordinary polymerization reactions, and its elimination from the reaction system has been considered to be essential or favorable for elevation of the yields of the polymers in such reactions. In recent years, however, attempts have been made to polymerize acetylene with conjugated diene compounds to produce random copolymers, and there has been proposed a catalyst composition comprising a dialkyl aluminum halide and an organic nickel compound for realization of such polymerization (hereinafter referred to as "the prior art 1") (cf. Japanese Patent Publication (examined) Nos. 48665/1974, 14272/1975, etc.). However, the yield of the copolymer in the prior art 1 is relatively low. Further, the composition of the produced copolymer is widely varied with the reaction time. In order to improve the yield of the copolymer in the prior art 1, it has been proposed to use water as the third component in the catalyst composition of the prior art 1 and maintain the molar ratio of the dialkyl aluminum halide and water within a certain range (hereinadfter referred to as "the prior art 2") (cf. Japanese Patent Publication (examined) No. 42398/1979, etc.). However, the improvement of the prior art 2 is not sufficiently great, and the objective copolymer is obtainable only in an unsatisfactory yield.

As a result of the extensive study, it has now been found that the use of a catalyst composition comprising a dialkyl aluminum halide, an organic nickel compound and an active hydrogen compound in certain relationships can enhance significantly the yield of the copolymer of acetylene and a conjugated diene compound with suppressing the by-production of a gel material. The present invention is based on this finding.

According to this invention, there is provided a process for preparing copolymers of acetylene and conjugated diene compounds by copolymerization of acetylene with at least one conjugated diene compound in the presence of a catalyst composition in a reactor, characterized in that the catalyst composition comprises a dialkyl aluminum halide, an organic nickel compound and an active hydrogen compound, of which the molar concentrations have the following relationships:

[Al] = 2[Ni] + [H]
[Al]/[Ni] > 4 wherein [Al], [Ni] and [H] represent respectively the molar concentrations of the dialkyl aluminum halide, of the organic nickel compound and of the active hydrogen compound.

As the conjugated diene compound, there may be used various ones. Those of the formula:

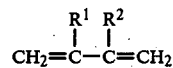

wherein $R^1$ and $R^2$ are each a hydrogen atom, a halogen atom (e.g. fluorine, chlorine, bromine, iodine) or a $C_1$-$C_6$ hydrocarbon group such as alkyl (e.g. methyl, ethyl, propyl, butyl, heptyl, hexyl) are preferable. Particularly preferred is 1,3-butadiene.

The catalyst composition of the invention comprises a dialkyl aluminum halide, an organic nickel compound and an active hydrogen compound as the essential components. The dialkyl aluminum halide may be, for instance, dimethyl aluminum chloride, dimethyl aluminum bromide, diethyl aluminum chloride, dipropyl aluminum chloride, dibutyl aluminum chloride, dipentyl aluminum chloride, dihexyl aluminum chloride or the like. Among them, diethyl aluminum chloride is the most suitable. Instead of these compounds themselves, any combination of two or more kinds of compounds which can provide substantially the dialkyl aluminum halide in situ under the reaction conditions may be employed. For instance, at least one of aluminum halide compounds of the formula:

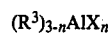

wherein $R^3$ is a $C_1$-$C_6$ hydrocarbon group, X is a halogen atom (e.g. chlorine, bromine) and n is a number of from 1.5 to 3 and at least one of trialkyl aluminum compounds of the formula:

wherein $R^3$ is as defined above may be used together so as to make a composition substantially equal to the corresponding dialkyl aluminum halide. Examples of the aluminum halide compound are aluminum trichloride, aluminum tribromide, methyl aluminum dichloride, ethyl aluminum dichloride, propyl aluminum dibromide, butyl aluminum dichloride, methyl aluminum sesquichloride, ethyl aluminum sesquichloride, etc. Examples of the trialkyl aluminum compound are trimethyl aluminum, triethyl aluminum, tripropyl aluminum, tributyl aluminum, tripentyl aluminum, trihexyl aluminum, etc.

As the organic nickel compound, there may be used nickel salts of organic acids, nickel salts of organic complex compounds, etc. More specifically, there may be used nickel formate, nickel acetate, nickel naphthenate, nickel benzoate, nickel palmitate, nickel octenate, nickel stearate, nickel oxalate, nickel ethylbenzoate, nickel cyclohexylbutyrate, nickel acetylacetonate, nickel ethyl acetoacetate, dicyclopentadienyl nickel, nickel salicyl aldehyde, nickel carbonyl, π-allyl nickel, π-crotyl nickel, bis-1,5-cyclooctadienyl nickel, etc.

As the active hydrogen compound, there may be exemplified water, organic acids (e.g. formic acid, acetic acid, propionic acid, oleic acid, naphthenic acid), alcohols (e.g. methanol, ethanol, propanol), etc.

The said three essential components of the catalyst composition is required to have the following relationships in their molar concentrations:

[Al] = 2[Ni] + [H]
[Al]/[Ni] > 4

Particularly, the ratio of [Al]/[Ni] is preferred to be between 5 and 20. No limitation is present on the amount of the catalyst composition in the polymerization reaction, but usually the amount of the organic nickel compound in the catalyst composition is set to be from about $10^{-5}$ to $10^{-2}$ mol to 1 mol of the starting monomers, i.e. acetylene and the conjugated diene compound.

The catalyst composition of the invention may be prepared by mixing the three essential components in the amounts as satisfying the said relationships, if desired, in the presence of the starting monomer(s) and/or an organic solvent and reacting together at a temperature of $-80°$ to $100°$ C., preferably of $-78°$ to $60°$ C., usually under an inert atmosphere. As the organic solvent as mentioned above, there may be used any one which does not afford any unfavorable influence on the polymerization reaction and, particularly, can dissolve the catalyst composition therein. Specific examples of such organic solvent are aliphatic hydrocarbons, alicyclic hydrocarbons, aromatic hydrocarbons, halogenated hydrocarbons, etc. Among them, aromatic hydrocarbons and halogenated hydrocarbons are the most suitable, and their specific examples are benzene, toluene, xylene, ethylbenzene, dichloromethane, dichloroethane, trichloroethylene, tetrachloroethylene, tetrachloroethane, chlorobenzene, dichlorobenzene, bromobenzene, etc. Toluene, xylene and dichloroethane are particularly preferred.

The preparation of the catalyst composition is preferred to be carried out in a closed vessel provided with a safety valve so as to maintain the alkane gas produced in the preparation of the catalyst composition at a predetermined pressure.

The polymerization is usually carried out by including the starting monomers with the catalyst composition in an organic solvent. Specifically, the starting monomers in a gaseous state may be introduced into the reaction system comprising the catalyst composition. Alternatively, the starting monomers in a liquid or solution form may be introduced into the reaction system comprising the catalyst composition. Further, the catalyst composition may be introduced into the reaction system comprising the starting monomers in a liquid or solution form.

Among these procedures, the most popular is the introduction of a gaseous mixture of acetylene and the conjugated diene compound into the reaction system comprising the catalyst composition in an organic solvent. The introduction may be carried out continuously at a constant rate. On such continuous introduction, it is preferred to keep the amount of acetylene to be introduced at a predetermined level, usually of not more than 60 mol, preferably of not more than 12 mol, to 1 mol of the nickel component in the catalyst composition per hour. Within the said limit, a higher amount can afford a better productivity. However, the level over the said limit is unfavorable because a great variation in the composition of the produced copolymer is produced and the amount of a gel material is increased. It is also preferred to introduce the conjugated diene compound into the reaction system with its constant ratio to acetylene.

The proportion of acetylene and the conjugated diene compound is not limitative, and the molar ratio of acetylene and the conjugated diene compound may be normally 1 or less, particularly ½ or less.

Favorably, the gaseous mixture has a water content of 100 to 100,000 ppm (v/v), preferably of 500 to 1,000 ppm (v/v), in order to ensure the reproducibility with an enhanced yield. For assuring the said water content, at least one of the monomers (preferbly acetylene) in a gaseous state may be exposed, for instance, to water or a saturated aqueous solution of any non-volatile inorganic salt (e.g. calcium chloride) prior to its introduction into the reaction system. When the water content is not within the said range, the yield of the copolymer may be rather deteriorated remarkably.

As the organic solvent for the reaction medium in the reaction system, there may be used any one as employed in the preparation of the catalyst composition. Thus, examples of the organic solvent include aliphatic hydrocarbons, alicyclic hydrocarbons, aromatic hydrocarbons, halogenated hydrocarbons, etc.

The polymerization is normally effected at a temperature of $-80°$ to $100°$ C., preferably of $0°$ to $60°$ C., under the atmosphere of an inert gas.

After the polymerization is completed, the reaction mixture may be subjected to post-treatment by a conventional procedure to recover the produced polymer. As the post-treatment, there may be adopted, for instance, treatment with an alcohol, treatment with an alcohol-hydrochloric acid, treatment with hydrochloric acid-water, treatment with an alkali, treatment with steam, etc. Any other operation conventionally employed for post-treatment in the polymerization with a Ziegler-Natta type catalyst may be also adopted.

One of typical examples of the preparation of the catalyst composition and the production of the copolymer using the same will be hereinafter explained referring to FIG. 1 of the accompanying drawings.

In FIG. 1 showing the outline of the preparation of the catalyst composition and the production of the copolymer according to the invention, the reactor 4 is provided with a agitator 1, an inlet for monomers 2 and a three-way cock 3. At the outlet portion, a safety valve 5, a pressure indicator 6 and an integrating flow meter 7 are provided. At the three-way cock 3, there is inserted an inlet pipe 10 from a vessel 9 equipped with a three-way cock 8. The safety valve 5 is preferably set so as to operate under a gauge pressure of not more than 2 kg/cm$^2$ from the viewpoint of safety.

In order to work with the said apparatus, the three-way cock 3 is retained at the state being not inserted with the inlet pipe 10, and an inert gas (e.g. nitrogen) is blown through the three-way cock 3 as indicated by the arrow mark A so as to wash the inside of the reactor 4. Separately, the inlet pipe 10 is inserted into the vessel 9 in such manner that one end of the inlet pipe 10 does not contact with the dialkyl aluminum halide in the vessel 9, and the inert gas is introduced into the vessel 9 through the three-way cock 8 as indicated by the arrow mark B so as to wash the inside of the inlet pipe 10. Then, the organic nickel compound and the organic solvent are charged in the reactor 4.

The other end of the inlet pipe 10 is inserted into the three-way cock 3, and the inert gas is introduced from the three-way cock 8 into the vessel 9 as indicated by the arrow mark B and flowed through the vessel 9, the inlet pipe 10, the reactor 4 and the safety valve 5 for deoxygenation. Simultaneously, the safety valve 5 is operated so as to retain the pressure in the reactor 4 at a constant level. Practically, it is favorable to provide the reactor 4 with a bypass for lowering the pressure so as to keep the inert gas in the reactor under atmospheric pressure. In this state, a designed amount of the active hydrogen compound is added to the reactor, and agitation is started.

The inlet pipe 10 is more deeply inserted into the vessel 9, and the inert gas is introduced from the three-way cock 8 as indicated by the arrow mark B to transfer the dialyl aluminum halide through the inlet pipe 10 to the reactor 4. After the transfer is completed, the inlet pipe 10 is taken out, and the three-way cock 3 is closed.

By the addition of the dialkyl aluminum halide, an alkane gas is evolved but the excessive gas is released into the air as indicated by the arrow mark C through the integrating flow meter 7 by the operation of the safety valve 5. While the inner pressure of the reactor 4 is retained at a constant level, the prepartion of the catalyst composition proceeds.

Then, a gaseous mixture of the starting monomers in a designed proportion is introduced into the reactor 4 through the inlet 2, and the polymerization is carried out. After the polymerization is completed, the reaction mixture is subjected to post-treatment.

The above procedure is meritorius in permitting strong agitation of the reaction mixture on the preparation of the catalyst composition and smooth incorporation of the dialkyl aluminum halide into the reactor, whereby aging can be omitted. As the result, the reproducibility on the preparation of the catalyst composition is enhanced with increase of the working efficiency.

The produced copolymer contains a diallyl type active methylene group so that it is apt to be gelled. Therefore, it is preferred to store the produced copolymer under the atmosphere of an inert gas and/or incorporate a gel-formation inhibitor for rubber (e.g. 2,6-di-t-butyl-p-cresol) into the produced copolymer for prevention of gellation.

Different from the prior art 1 and the prior art 2, the process of the invention can produce the copolymer in an excellent yield without producing any gel material.

The copolymer prepared by the process of this invention has various uses. It is particularly useful as a resin for coating compositions.

Practical and presently preferred embodiments of the invention are illustratively shown in the following Examples.

EXAMPLE 1

In this Example, 1,3-butadiene was used as the conjugated diene compound. The catalyst composition was prepared by the use of nickel naphthenate, diethyl aluminum chloride and water.

In a 5 liter volume round bottom flask, dry toluene (2 kg) was charged, and nickel naphthenate (50 mmol) was added thereto. Nitrogen gas was introduced therein for deoxygenation, and the water content was measured to be 448 ppm. Thus, the water was contained in an amount of 50 mmol. In order to adjust the proportion of [Ni], [H$_2$O] and [Al] to a pre-determined one, a suitable amount of water was added thereto, and a designed amount of diethyl aluminum chloride was further added thereto while stirring. Then, a mixture of acetylene and butadiene (1:10 by mol) was introduced therein so that the charged amounts of acetylene and butadiene reached respectively to 2 mol (52 g) and 20 mol (1080 g) after 5 hours. Thereafter, the total weight of the reaction mixture and the concentration of non-volatile components therein (nitrogen stream, 110° C.×20 minutes) were determined. The proportion of the weight of the non-volatile components (comprising the produced copolymer and the catalyst components) to the weight of the charged monomers (1132 g) was calculated, and the conversion (%) was obtained therefrom.

When the conversion was 100%, any gel material was not by-produced, and any unreacted monomer dissolved in the reaction mixture was not present. This case was judged to be acceptable (O). When the conversion was not 100% but the production of the polymer was recognized, it was judged to be (Δ). When the conversion was less than 10%, it was judged to be (X), because any analyzable polymer was not obtained.

Figure 2:
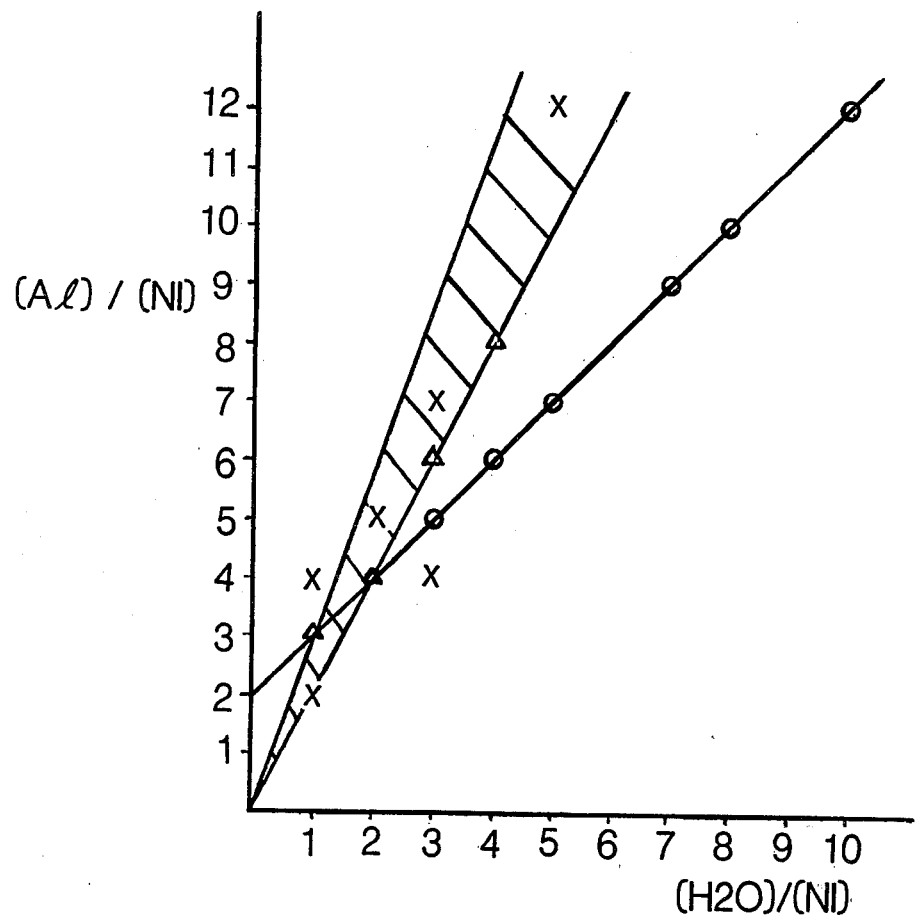

The relationship between the catalyst composition and the judgment on the polymerization results is shown in FIG. 2, from which it may be understood that the value (O) is not obtained with the catalyst composition satisfying the condition of [H$_2$O]/[Al]=0.35−0.5:1 according to the prior art 2 (cf. the hatched portion in FIG. 2). Although the catalyst composition corresponding to [Ni]/[H$_2$O]/[Al]=1:2:5 as described in the working example of the prior art 2 was examined 10 times, the results were always the value (X).

On the other hand, the catalyst composition of the invention gave always the value (O) and indicated a conversion of 100% without by-production of any gel material. Under the condition of [H$_2$O]/[Ni]=1:1, there was produced a small amount of a gel material, but the conversion was relatively good, i.e. about 90%.

The copolymer in the case of the conversion being 100% was subjected to analysis. As the result, it was confirmed that the micro-structure contains the cis-form in more than 70%. The NMR spectrum revealed that the composition of the copolymer is identical with that of the charged monomers, i.e. acetylene/butadiene=1:10 by mol, and the acetylene content is 9.0%. The dyad fraction was nearly identical with the theoretical value at the random polymerization. In case of the value (Δ), the toluene-soluble component showed a dyad fraction of a random polymer but the acetylene content was more than 9.0%.

EXAMPLE 2

Using a commercial product of nickel naphthenate confirmed to contain free naphthenic acid in a nearly equimolar amount to nickel naphthenate, a catalyst composition was prepared under the condition of [Ni]/[H$_2$O]/[Al]=1:2:5. The free naphthenic acid worked as an equivalent to water and satisfied the relationship of the invention, i.e. [Ni]/[H]/[Al]=1:3:5. Thus, the polymerization using the catalyst composition proceeded with a conversion of 100%. This result is quite notable, because no polymerization proceeded in Example 1 using a pure product of nickel naphthenate.

EXAMPLE 3

Using a pure product of nickel naphthenate and incorporating water, naphthenic acid and diethyl aluminum chloride therein in respective amounts of 4 mol, 1 mol and 7 mol per 1 mol of nickel so as to satisfy the condition of [Al]=2[Ni]+(H$_2$O+naphthenic acid), there was prepared a catalyst composition. The polymerization by the use of this catalyst composition proceeded with a conversion of 100% without by-production of any gel material.

EXAMPLE 4

Using a pure product of nickel naphthenate and incorporating water, acetic acid and diethyl aluminum chloride therein in respective amounts of 4 mol, 1 mol and 7 mol per 1 mol of nickel so as to satisfy the condition of [Al]=2[Ni]+(H$_2$O+acetic acid), there was prepared a catalyst composition. The polymerization by the use of this catalyst composition proceeded with a conversion of 100% without by-production of any gel material.

EXAMPLE 5

In the same manner as in Example 4 but using ethanol in place of acetic acid, a catalyst composition was prepared. The polymerization was carried out using the catalyst composition, and the substantially same results as in Example 4 were obtained.

EXAMPLE 6

In the same manner as in Example 1 but using isoprene in place of butadiene, the polymerization was carried out. The substantially same results as in Example 1 was obtained.

EXAMPLE 7

In this Example, 1,3-butadiene was used as the conjugated diene compound. The catalyst composition was prepared by the use of nickel naphthenate, diethyl aluminum chloride and water to make a proportion of [Ni]:[H$_2$O]:[Al] = 1:5:7.

In a 5 liter volume round bottom flask, dry toluene (2 kg) was charged, and nickel naphthenate (30 mmol) was added thereto. Nitrogen gas was introduced therein for deoxygenation, and the water content was measured. In order to adjust the proportion of [Ni], [H$_2$O] and [Al] as above, a suitable amount of water was added thereto, and a designed amount of diethyl aluminum chloride was further added thereto while stirring. Then, a mixture of acetylene and butadiene (1:10 by mol) was introduced therein, and with the progress of the polymerization, the concentration of the non-volatile components in the reaction mixture (nitrogen stream, 110° C.×20 minutes) was determined.

Of the monomers as used, butadiene was a commercial product having a purity of not less than 99.0% and a water content of not more than 100 ppm. In order to eliminate the polymerization inhibitor (catechols), the butadiene was passed through a column of potassium hydroxide pellets. Acetylene was also a commercial product dissolved in acetone. In order to eliminate the acetone and oxidative impurities, the acetylene was passed through a saturated aqueous solution of sodium hydrogen sulfite. Then, it was passed through a column of potassium hydroxide pellets for removal of acidic substances and passed through a column of calcium chloride pellets for drying. After these treatments, acetylene and 1,3-butadiene, each having a water content of not more than 100 ppm, were combined together to make a gaseous mixture of acetylene and butadiene in a molar ratio of 1:10.

Prior to the above combination, the once purified and dried acetylene was passed through a saturated aqueous solution of calcium chloride at 0° C. to make acetylene having a water content of 2,500 ppm, which was then combined with the said purified and dried butadiene to make their mixed gas having a water content of 240 ppm. Likewise, there were prepared the mixed gases having water contents of 680 ppm and 1,100 ppm.

Figure 4:
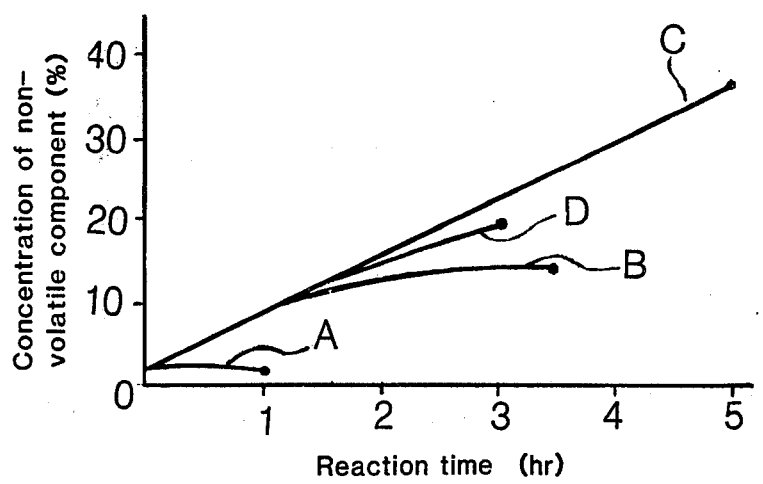

Using the above obtained mixed gas having a water content of not more than 100 ppm (A), 240 ppm (B), 680 ppm (C) or 1,100 ppm (D), polymerization was carried out. The concentration of the non-volatile components in the reaction mixture with the reaction time is shown in FIG. 4.

In case of the water content being not more than 100 ppm, the production of a gel material was observed on the wall of the flask, and the increase of the non-volatile components in the reaction mixture was not recognized.

A great portion of the charged gas starting materials was discharged, and the polymerization reaction did not materially proceed. Thus, the operation was stopped in 1 hour.

In case of the water content being 240 ppm, the exhaustion of the charged gas took place after 3 hours, and the operation was stopped in 3.5 hours.

In case of the water content being 680 ppm, the non-volatile components increased proportionally even after 5 hours. The charged gas was completely absorbed into the reaction system, and the discharge of the unreacted monomers was not observed, although the exhaustion of an alkane gas was recognized. Acetylene (2 mol; 52 g) and butadiene (20 mol; 1080 g) were consumed in 5 hours, and then the operation was stopped, although further polymerization was apparently possible.

The reaction mixture was subjected to post-treatment to obtain the copolymer, which was then subjected to analysis. The results are shown in Table 1.

TABLE 1

| Mixed gas | A | B | C | D |
|---|---|---|---|---|
| Water content (ppm) | 100> | 240 | 680 | 1100 |
| Reaction time (hr) | 1.0 | 3.5 | 5< | 3.0 |
| Amount of charged monomers (g) | 226 | 790 | 1132 | 680 |
| Amount of reaction mixture (g) | 2300 | 2800 | 3150 | 2690 |
| Concentration of non-volatile components in reaction mixture (%) | 3.5 | 15.5 | 36.5 | 19.9 |
| Amount of non-volatile components (g) | 81 | 435 | 1150 | 535 |
| Amount of produced copolymer after post-treatment (g) | 0 | 510 | 1125 | 600 |
| Appearance of copolymer | — | Yellowish brown | Pale yellow | Yellowish brown |
| Acetylene content in copolymer (%) | — | 14.5 | 9.0 | 13.5 |
| Amount of cis-form according to IR (%) | — | 75 | 79 | 76 |
| Randomness | — | Random | Random | Random |

EXAMPLE 8

In this Example, the apparatus as shown in FIG. 1 was employed. 1,3-Butadiene was used as the conjugated diene compound. The catalyst composition was prepared by the use of nickel naphthenate, diethyl aluminum chloride and water. In a 5 liter volume reactor, dry toluene (2 kg) was charged, and nickel naphthenate (50 mmol) was added thereto. Nitrogen gas was introduced therein for deoxygenation. In the reaction system, a pressure indicator of −760 mmHg to 1 kg/cm$^2$G and a safety valve operating at 0.5 kg/cm$^2$G were provided, and it was confirmed that nitrogen gas could be safely exhausted at 0.5 kg/cm$^2$G.

The water content in the reaction system was measured, and water was added thereto to make a water content of 150 mmol. While stirring vigorously to ensure a dispersion state, diethyl aluminum chloride (250 mmol) was transferred thereto by the aid of nitrogen gas. The reaction system immediately reached to 0.5 kg/cm$^2$G by the ethane gas evolved, and the ethane gas was released from the safety valve.

The addition of diethyl aluminum chloride completed in 15 seconds. Immediately thereafter, a gaseous mixture of acetylene and butadiene in a molar ratio of 1:10 was introduced therein at a constant rate. After 5 hours, the charged amounts of acetylene and butadiene reached 2 mol (52 g) and 20 mol (1080 g), respectively. During this period, the exhausted gas amount was 9.5 liters, which corresponded to less than 2% of the charged volume (528 liters) of the monomers. This was due to gaseous impurities in the monomers, and neither acetylene nor butadiene was detected from the exhausted gas.

The weight of the reaction mixture and the concentration of the non-volatile components therein were measured, and the produced copolymer was calculated to be 1150 g. Thus, it was confirmed that the charged monomers (1132 g) were completely converted into the copolymer. The reaction mixture was subjected to post-treatment, whereby a pale yellow, liquid polymer (1100 g) was obtained. Molecular weight determined by GPC: Mn=2,200. Micro-structure according to IR: cis-form, 75%. NMR analysis: the composition of the copolymer corresponded to that of the charged monomers, i.e. containing 9.0% of acetylene. The dyad fraction corresponded to the theoretical value on the random copolymerization.

EXAMPLE 9

The catalyst compositions (A), (B), (C) and (D) were prepared by the use of nickel naphthenate, diethyl aluminum chloride and water in different proportions as shown in the following table:

| Catalyst composition | $[Ni]:[H_2O]:[Al]$* |
|---|---|
| (A) | 1:8:10 |
| (B) | 1:2:4 |
| (C) | 1:2:3 |
| (D) | 1:2:5 |

Note:
*indicated by the molar concentration.

Polymerization was carried out with 1,3-butadiene (20 mol; 1080 g) and acetylene (2 mol; 52 g). Nickel naphthenate was used in an amount of 50 mmol. The reaction was effected in a 5 liter volume round bottom flask sealed with nitrogen at 30° C. using toluene (2 kg) as the reaction medium. Acetylene having a feed rate of 0.5 to 30 mol/hour and a specific rate (per mol of nickel) of 10 to 60 hr$^{-1}$ was admixed with butadiene to make a gaseous mixture in a molar proportion of acetylene/butadiene=1:10, and the gaseous mixture was subjected to polymerization.

Figure 3:
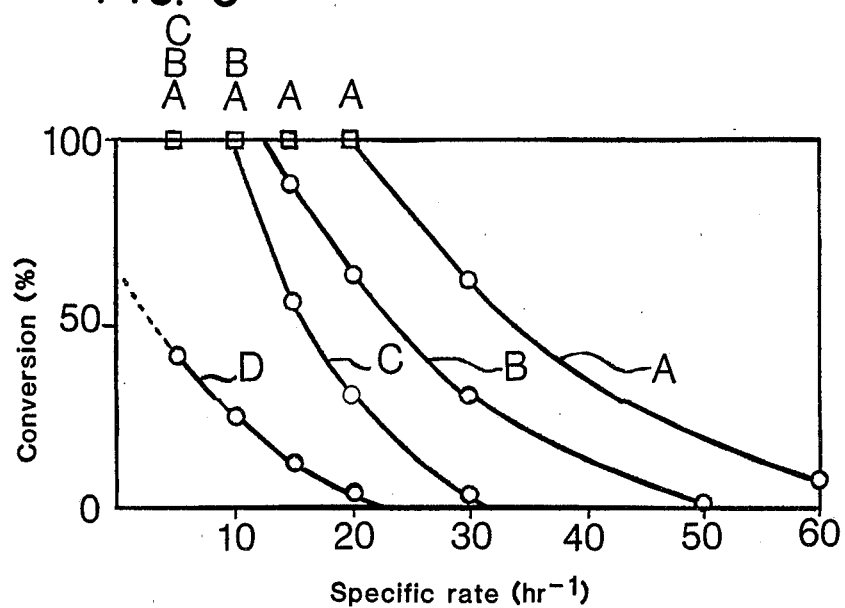

After a total amount (1132 g) of the gaseous mixture was charged, nitrogen was introduced into the reaction mixture to expel the unreacted monomers. Then, water (100 g) was added thereto to inactivate the catalyst composition, and stirring was effected for 30 minutes. The resultant mixture was allowed to stand for 12 hours and was subjected to centrifugation. The deposited material was washed with toluene, and the toluene solution was concentrated by a flash evaporator and dried by a rotary evaporator to give a copolymer having a content of non-volatile components of 100%. In the blank test, a maximum loss of about 5% was recognized in the centrifugation step and the concentration step. Thus, the yield was calculated by multiplying the obtained amount by 1.05, and the conversion (%) of the monomers into the copolymer was calculated on the basis of the charged weight (1132 g) of the monomers. The relationship of the conversion of the monomers with the specific rate of acetylene is shown in FIG. 3, from which it is understood that a conversion of 100% (indicated by the mark □) can be attained with the catalyst composition (A) and specific rates of 20, 15, 10 and 5 hr$^{-1}$, with the catalyst composition (B) and specific rates of 10 and 5 hr$^{-1}$ and with the catalyst composition (C) and a specific rate of 5 hr$^{-1}$.

The copolymer thus obtained had an acetylene content of 9% and was identified with the charged composition of acetylene/butadiene=1:10.

The copolymer in case of the conversion being more than 50% but less than 100% indicated the increase of the acetylene content with the decrease of the yield. When the conversion was remarkably low, the by-production of a gel material was notable, and the acetylene content of the produced copolymer reached up to 33%. Even such copolymer was confirmed to be a random copolymer by the dyad fraction.

When the catalyst composition (D) was used, the production of a gel material was great, and the pressure of the reactor reached more than 0.5 kg/cm$^2$G prior to charging 1132 g of the monomers and also the inlet was clogged with the produced gel material, whereby the further charging of the monomers became impossible. In case of the feed rate of acetylene being 5 hr$^{-1}$, however, the copolymer was obtained in a conversion of 45%.

EXAMPLE 10

As in Example 9, acetylene and isoprene were subjected to copolymerization in the presence of the catalyst composition (A). Since isoprene is a liquid at room temperature, it was introduced into the reaction system by dropwise addition so as to comply with the feed rate of acetylene.

Comparison was made between the feed rates of acetylene of 5 hr$^{-1}$ and of 15 hr$^{-1}$. When the feed rate was 5 hr$^{-1}$, the conversion was 100%, and the produced copolymer had an acetylene content of 9%. When feed rate was 15 hr$^{-1}$, the conversion was 65% with by-production of a gel material in a small amount, and the produced copolymer had an acetylene content of 15%. Still, these were the results when inactivation treatment was effected immediately after the completion of the charging of acetylene.

When aging was carried out for 3 hours after the completion of charging and then inactivation treatment was effected, the conversion increased to 99% even in case of the feed rate of 15 hr$^{-1}$, and the acetylene content of the copolymer became 8%. This is due to the conversion of the block copolymer of acetylene into the gel material not soluble in toluene.

What is claimed is:

1. A process for preparing copolymers of acetylene and conjugated diene compounds by copolymerization of acetylene with at least one conjugated diene compound in the presence of a catalyst composition in a reactor, wherein the catalyst composition comprises a dialkyl aluminum halide, an organic nickel compound and an active hydrogen compound selected from the group consisting of water, organic acids and alcohols, of which the molar concentrations have the following relationships:

$[Al]=2[Ni]+[H]$ $[Al]/[Ni]>4$ wherein [Al], [Ni] and [H] represent respectively the molar concentrations of the dialkyl aluminum halide, of the organic nickel compound and of the active hydrogen compound.

2. The process according to claim 1, wherein the catalyst composition is the one prepared in a closed vessel equipped with a safety valve so as to keep the alkane gas evolved in the preparation of the catalyst composition at a pre-determined pressure.

3. The process according to claim 1, wherein the acetylene is fed continuously into the reactor at a predetermined and controlled rate together with the conjugated diene compound in a constant proportion.

4. The process according to claim 1, wherein the monomers to be fed continuously into the reactor are so controlled that the water content of a mixture of the monomers is from 100 to 10,000 ppm (v/v).

5. The process according to claim 1, wherein the conjugated diene compound is the one of the formula:

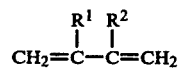

wherein $R^1$ and $R^2$ are each a hydrogen atom, a halogen atom or a hydrocarbon group having not more than 6 carbon atoms.

6. The process according to claim 1, wherein the feed rate of the acetylene into the reactor is not more than 60 mol/hour/mol of nickel in the catalyst composition.

7. The process according to claim 1, wherein the acetylene is moistened and then admixed with the dried conjugated diene compound.

* * * * *